United States Patent

[11] 3,576,361

| [72] | Inventors | Tokusaburo Kakiuchi;<br>Ikuji Katoh, Tokyo, Japan |
|---|---|---|
| [21] | Appl. No. | 727,224 |
| [22] | Filed | May 7, 1968 |
| [45] | Patented | Apr. 27, 1971 |
| [73] | Assignee | Kabushiki Kaisha Ricoh<br>Tokyo, Japan |
| [32] | Priority | May 6, 1967 |
| [33] | | Japan |
| [31] | | 42/28640 |

[54] DEVICE FOR AUTOMATICALLY FORMING FILM-LOOP IN A MINIATURE MOVIE PROJECTOR
5 Claims, 3 Drawing Figs.

[52] U.S. Cl. .................................. 352/157, 352/159
[51] Int. Cl. .................................. G03b 1/56
[50] Field of Search .......................... 352/157, 159

[56] References Cited
UNITED STATES PATENTS

| 2,434,355 | 1/1948 | Fairbanks | 352/159X |
| 2,494,842 | 1/1950 | Thevenaz | 352/159 |
| 2,807,188 | 9/1957 | Badgley | 352/77 |
| 3,081,925 | 3/1963 | Hanken | 352/159X |
| 3,432,229 | 3/1969 | Freudenschusz | 352/176 |

*Primary Examiner*—John M. Horan
*Assistant Examiner*—Michael Harris
*Attorney*—Burgess, Ryan and Hicks ABSTRACT: A projector has means for feeding a sound movie film strip through a gate on the optical axis of a projecting lens and then past a takeup sprocket wheel. The sprocket wheel is mounted on the movable end of a pivoted arm and is swung into contact with the film during a loading step by a spring which rotates the movable end of the pivoted arm toward the film. The sprocket wheel rotates on its axis during the swinging step as a coaxial gear to which it is rigidly fastened rolls over the surface of a nonrotating drive gear which is positioned coaxially with the pivot of the pivoted arm. The rotation of the sprocket wheel during the loading step "backs up" the film toward the gate and forms a loop therein to accommodate an intermittent film mechanism at the gate.

PATENTED APR 27 1971 3,576,361

INVENTOR
TOKUSABURO KAKIUCHI
IKUJI KATOH
BY Burgess, Ryan & Hicks
ATTORNEYS 3,576,361

DEVICE FOR AUTOMATICALLY FORMING FILM-LOOP IN A MINIATURE MOVIE PROJECTOR

BACKGROUND OF THE INVENTION

This invention relates to a device for automatically forming a film-loop in a movie projector, and in particular, to a device for automatically forming a film-loop in a miniature movie projector.

In a movie projector, as is generally known, the movie film must be intermittently moved past the projection window. The film is wound up, however on the takeup reel in a continuous motion regardless of the above mentioned intermittent motion. Since the sprocket wheel which moves the film after it has passed the projection window rotates, at a uniform speed means must be provided to form a film-loop between the projection window portion and said sprocket wheel.

In a miniature-type movie projector said window and sprocket are positioned with a relatively short distance between them. In particular, in the case of a projector as is described hereinafter, wherein the movie film is fitted into the projector while contained in a cartridge, the projection window and the sprocket wheel on the take up side are very close to each other, and therefore it is difficult to form a film-loop of desirable length with the tips of the fingers at a predetermined position after having fitted the film into the projector.

SUMMARY OF THE INVENTION

In accordance with this invention, the film cartridge is placed in the projector and the film is positioned in the film track across the projection window. From the projecting window the film extends over the guide rollers on the take up side. After the film is so positioned, a movably supported sprocket wheel for winding the film is moved against the hanging film while the sprocket wheel rotates around a drive-gear in a direction to drive the film toward the projection window. The film-loop can be automatically formed thus slightly reversing said film by fitting the perforations of the film to said rotating sprocket wheel.

When the present invention is applied to a miniature type sound movie projector, an additional desirable result can be obtained. In such a projector the loop-forming motion of the sprocket can be utilized to pinch the sound recorded portion of said film between a drum (which is coaxially mounted on said sprocket wheel with a diameter almost the same as that of the pitch circle of the sprocket wheel) and the sound reproducing head.

DESCRIPTION OF A PREFERRED EMBODIMENT

Figure 1:
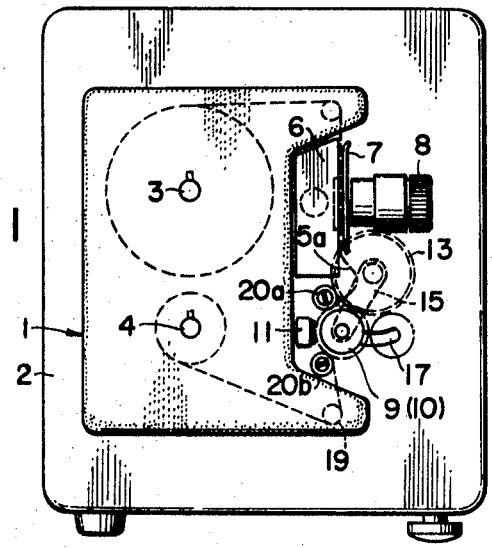
FIG. 1 shows a side view of an embodiment of a miniature type talkie-movie projector having the device for automatically forming the film-loop of this invention.

FIG. 1 is a diagram showing a miniature type sound movie projector which has become popular of late, wherein the cartridge 1 (see FIG. 3) for containing sound movie film is directly charged into the sound movie projector 2.

Said cartridge is shaped almost in the form of a rectangular box, and the film releasing shaft 3 and the take up shaft 4 extend in parallel between the two sidewalls. The film 5 released from the film roll on said shaft 3 is once exposed outside the cartridge, and thereafter it is drawn into the cartridge again, and is taken up on the shaft 4 through the guide roller 19. Said take up shaft 4 can be driven by the projector driver when the cartridge has been mounted on the projector.

In FIG. 1, the light source chamber 6, the film pressing board 7, projecting lens 8, the sprocket wheel 9 for taking up the film, the sound drum 10 homoaxially united to said sprocket wheel 9, the sound reproducing head 11, and the rollers 20a, 20b for determining the limitation of the movement of the movable sprocket wheel 9 as described hereinafter, are provided on one of the sidewalls of the projector 2. The pitch circle of the sprocket wheel 9 and the drum 10 are of almost the same radius, and are fixed on the common shaft 12.

Figure 2:
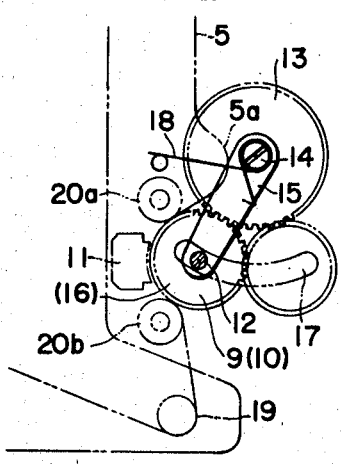
FIG. 2 shows an enlarged partial side view of the device of the present invention in the projector shown in FIG. 1.

Said common shaft 12 is rotatably supported on the free end of the arm 15 which is in turn supported by the shaft 14, as the axis of rotation, of the drive-gear 13 provided within the projector body. The gear 16 whose center is fixed on said shaft 12, is meshed with said drive-gear 13. Said shaft 12 can move within the arcuate groove 17 in the projector sidewall, the center of which arcuate groove is the shaft 14 of said drive gear 13. Arm 15 is biased to rotate in the clockwise direction round the shaft 14 by the elastic force of the spring 18 as is shown in FIG. 2. Normally a part of the teeth of the sprocket wheel 9 are inserted into the path of the film as it extends in a straight line between the gate of the projecting window and the film winding guide roller 19 within the cartridge 1.

Figure 3:
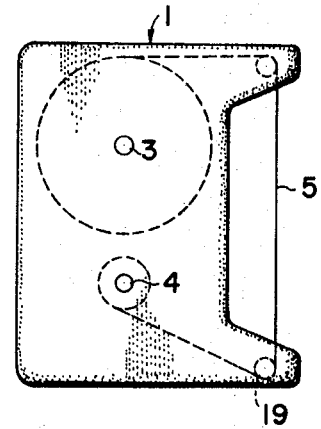
FIG. 3 shows a side view of the movie-film cartridge adapted for use in the projector shown in FIG. 1.

Thus, the cartridge 1 containing the film (as is shown in FIG. 3), can be placed in the projector 2 of FIG. 1 while the arm 15 is rotated in the counter clockwise direction as shown in the drawings, round the center shaft 14 against the elastic force of the spring 18. The tip of a finger may be employed to so rotate arm 15. When said cartridge has been mounted at the predetermined position in the projector, said sprocket wheel 9 and the drum 10 are allowed to move against the film and to press the film against the fixed head 11.

In the above-described state, when the tip of the finger is released from said arm 15, the gear 16 on the shaft 12, which is geared with the gear 13 within the projector, rotates while revolving around said gear 13, and therefore the sprocket wheel 9 on the shaft 12 is also rotated with said shaft 12, and said sprocket wheel 9 is moved to the left, and stops at the position where the sprocket wheel or the appropriate portion of the rotatable drum presses the film against the rollers 20a, 20b.

During this operation the teeth of the sprocket wheel enter the perforations of the film. The rotation of the sprocket wheel then reverses the film slightly and the loop 5a then forms as is shown in FIG. 2.

The peripheral surface of the drum, which is coaxially united to the sprocket wheel, pinches the sound recording zone of the film against the head 11 at the limiting position of the left hand movement of said sprocket wheel, and thus, positions the film for projection.

The above given embodiment is illustrated in a sound movie projector but when the automatic formation of the film-loop is aimed at, it is possible to apply the present invention to a conventional soundless movie projector. In other words, when the present invention is applied to soundless movie projector, the drum which is coaxially united to the sprocket wheel 9 is removed from the movable sprocket wheel 9, and at the same time the head 11 is removed from the projector body.

The above embodiment has been explained in connection with a projector equipped with a cartridge for containing the film, but it is obvious that the present invention can also be applied to a projector of general type according to which the film is spanned over the take up reel from the film supplying reel.

The device of the present invention is very convenient for use with cartridge-type projectors, because the film-loop can be automatically formed between the projecting window portion and the sprocket wheel when the movie film is charged into the miniature type movie projector wherein the distance between the projecting window portion and the sprocket wheel on the film take up side is short.

In addition, in the case of a sound movie projector, a drum is coaxially provided on the movable sprocket wheel, and the sound reproducing operation can be carried out by the cooperation of a head fixed on the side of the projector body and the sprocket, and therefore it is possible to minimize the structure of the sound movie projector to a great extent, and remarkable convenience can be achieved.

We claim:
1. A combination loop-forming and film-advancing mechanism adapted to contact at a contact position a length of film which is stretched between a first guide means and a second guide means and to advance said film in an advancing direction from the first to the second guide means after forming a loop therein between the first guide means and the contact position, said mechanism comprising:
a drive gear adapted for rotation in a first direction about a drive gear axis during a film-advancing operation;
a swing arm mounted for rotation about the drive gear axis;
a planetary gear mounted on the swing arm and meshed with the drive gear, said planetary gear having a planetary gear axis positioned eccentrically with respect to the drive gear axis;
a sprocket wheel positioned coaxially with the planetary gear and united to said planetary gear for rotation therewith, said swing arm, planetary gear, and sprocket wheel being movable from a loading position to a film-advancing position as the swing arm rotates about the drive gear axis in the first direction;
film engaging means on the sprocket wheel for engaging and advancing the film in response to rotation of the sprocket wheel, said film engaging means engaging the film at the contact position as the swing arm, planetary gear, and sprocket wheel move from the loading position to the film-advancing position and moving said film during said motion in a direction opposite to the advancing direction, whereby a loop is formed in said film between the first guide means and the contact position.

2. The mechanism of claim 1 comprising first and second guide rollers spaced from each other and positioned to contact the film and press the film into contact with the film-engaging means when the sprocket wheel is in the film-advancing position.

3. The mechanism of claim 1 comprising means for resiliently urging the swing arm into the film-advancing position.

4. The mechanism of claim 1 comprising:
a sound reproducing head; and
a drum mounted coaxially with the sprocket wheel for rotation therewith, said sound-reproducing head and said drum being so positioned that the drum presses the film which is engaged by the film-engaging means on the sprocket wheel against the sound-reproducing head.

5. The mechanism of claim 4 comprising first and second guide rollers located on opposite sides of the sound-reproducing head and positioned to contact the film and press the film into contact with the film-engaging means when the sprocket wheel is in the film-advancing position.